US009527607B2

(12) United States Patent
Celerier (10) Patent No.: US 9,527,607 B2
(45) Date of Patent: Dec. 27, 2016

(54) PROPULSION SYSTEM FOR SATELLITE ORBIT CONTROL AND ATTITUDE CONTROL

(71) Applicant: THALES, Neuilly-sur-Seine (FR)

(72) Inventor: Bruno Celerier, Auribeau sur Siagne (FR)

(73) Assignee: THALES, Courbevoie (FR)

( * ) Notice: Subject to any disclaimer, the term of this patent is extended or adjusted under 35 U.S.C. 154(b) by 610 days.

(21) Appl. No.: 13/875,190

(22) Filed: May 1, 2013

(65) Prior Publication Data
US 2013/0292516 A1 Nov. 7, 2013

(30) Foreign Application Priority Data

May 3, 2012 (FR) ...................... 12 01279

(51) Int. Cl.
*B64G 1/40* (2006.01)
*B64G 1/26* (2006.01)
*B64G 1/24* (2006.01)
(52) U.S. Cl.
CPC ............... *B64G 1/409* (2013.01); *B64G 1/242* (2013.01); *B64G 1/26* (2013.01); *B64G 1/405* (2013.01)

(58) Field of Classification Search
CPC ...................................................... B64G 1/409
See application file for complete search history.

(56) References Cited

U.S. PATENT DOCUMENTS 5,020,746 A  6/1991  Anzel
6,565,043 B1  5/2003  Wittmann

FOREIGN PATENT DOCUMENTS

NL       1032158       1/2008

*Primary Examiner* — Brian M O'Hara
(74) *Attorney, Agent, or Firm* — Baker & Hostetler LLP (57) ABSTRACT

A propulsion system for the orbit control of a satellite with terrestrial orbit having an angular momentum accumulation capacity comprises a propulsion unit able to deliver a force along an axis F having a component perpendicular to the orbit, and a motorized mechanism connected on the one hand to the propulsion unit and on the other hand to a structure of the satellite, the motorized mechanism being able to displace the propulsion unit along an axis V parallel to the velocity of the satellite, and able to orient the propulsion unit so as to make it possible to control: a component of the force along the axis V, for orbit control, an amplitude and a direction of couple in a plane perpendicular to the axis F, for control of the angular momentum.

10 Claims, 9 Drawing Sheets

PROPULSION SYSTEM FOR SATELLITE ORBIT CONTROL AND ATTITUDE CONTROL

CROSS-REFERENCE TO RELATED APPLICATION

This application claims priority to foreign French patent application No. FR 1201279, filed on May 3, 2012, the disclosure of which is incorporated by reference in its entirety.

TECHNICAL FIELD

The present invention relates to the field of satellite orbit control and attitude control systems, and more particularly the architecture of the on-board propulsion systems for orbit control of geostationary telecommunications satellites.

To allow the use of the various mission instruments of a satellite, such as telecommunications systems, the position and the orientation of the satellite in orbit have to be controllable. In addition to the gravitational attraction of the earth, a satellite experiences several forces of lower magnitudes which progressively disturb its position and its orientation. The gravitational attraction of the sun and moon, the deformation of the earth at the level of the equator, or else the solar radiative pressure generate drifts that have to be corrected. Control systems are implemented so as to maintain on the one hand the orientation of the satellite with respect to the earth, this being attitude control, and on the other hand its position in orbit with respect to a desired ideal position, this being orbit control.

For example in the case of geostationary satellites, orbit control seeks to limit the inclination with respect to the equatorial plane, to limit the eccentricity of the orbit, and to limit the drift of the longitudinal position of the satellite with respect to the earth. Accordingly, propulsion units are positioned at various locations on the satellite to correct the trajectory at more or less close intervals by applying a force to the satellite. These operations for maintaining station require that a sufficient reserve of fuel may be made available throughout the life of the satellite. To limit the cost and the mass of orbit control devices, a new architecture of propulsion systems is envisaged.

BACKGROUND

A satellite is placed in orbit through the combination of a launcher space vehicle and of its own propulsion systems. The launcher transports and releases the satellite on a first, so-called transfer, terrestrial orbit, whose perigee is generally low; once on this first orbit, a propulsion system of the satellite takes over so as to transport the satellite to its final orbit. Generally, this transfer is carried out by means of a principal satellite propulsion unit PSP consuming a chemical fuel of propellant type, delivering a high-power thrust making it possible to quickly reach the final orbit.

Once in post, several secondary propulsion units of lower powers maintain the satellite in position on the orbit. Accordingly, propellant-based chemical propulsion units or electric propulsion units can be used. In an electric propulsion unit, of the plasma propulsion unit or ion propulsion unit type, xenon atoms are ionized by collision with electrons, creating xenon ions. Thrust is generated when the charged xenon ions are accelerated out of the propulsion unit by an electromagnetic field. Although expensive and of significant initial mass, the effectiveness of the propulsion unit, or its capacity to generate force by ejection of mass, also called specific impulse, is substantially more significant than that of chemical propulsion units.

In the known systems, chemical propulsion units and electric propulsion units are positioned at several locations on the structure of the satellite to meet all the requirements of the mission, from transport from the transfer orbit to maintaining in orbit throughout the life of the satellite. The drawback of the propulsion systems thus implemented is a high cost and high mass, of the various propulsion units and of the fuel. These drawbacks limit the satellite's payload carrying capacity.

Figure 1:
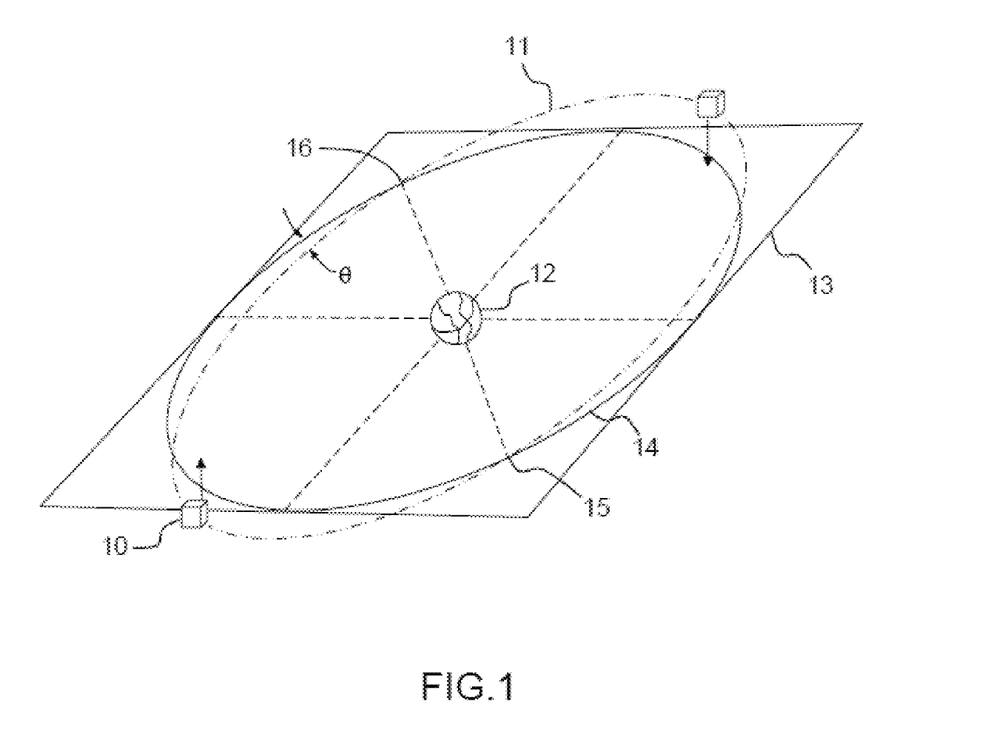
FIG. 1, already presented, represents a geostationary satellite in orbit around the earth, FIG. 2, already presented, represents a contemporary architecture of a satellite comprising a structure on which are fixed various devices useful for the piloting of the satellite and for its mission, FIGS. 3a, 3b and 3c, already presented, illustrate the principle of orbit control for a satellite according to the known state of the art.

According to the known state of the art, an orbit control system seeks to pilot the position of the satellite through six orbital parameters. FIG. 1 represents a geostationary satellite 10 in orbit 11 around the earth 12. The orbit 11 is inclined by an angle θ with respect to the equatorial plane 13 which contains the ideal geostationary orbit 14. The orbit 11 of the satellite cuts the equatorial plane 13 at two points 15 and 16, commonly called orbital nodes. The six orbital parameters used to convey the position of a satellite are also known: the semi-major axis, the eccentricity, the inclination, the argument of the ascending node, the argument of the perigee, and the true anomaly. Orbit control consists in quantifying these orbital parameters and in carrying out the operations required by means of the on-board propulsion systems, to maintain the satellite in a predefined zone around an ideal position. By way of example, for a geostationary satellite, a drift window of plus or minus 0.1°, representing a width of almost 150 km, is allocated around a target position.

Figure 2:
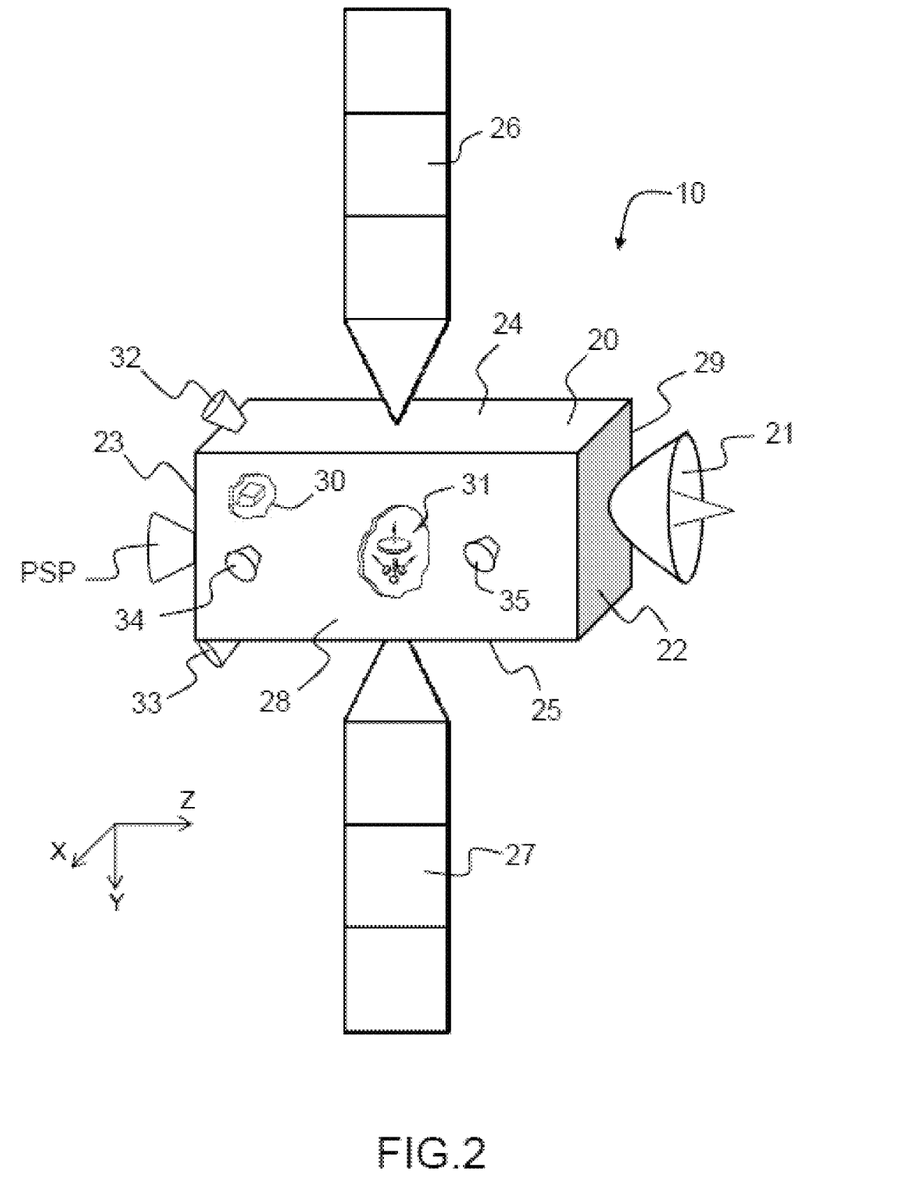

A contemporary architecture, such as represented in FIG. 2, of a satellite 10 comprises a parallelepipedal structure 20 on which are fixed various devices useful for the piloting of the satellite 10 and for its mission. Telecommunications instruments 21 are installed on a face 22 whose orientation is maintained towards the earth, commonly called the earth face. On an opposite face 23, commonly called the anti-earth face, is positioned the principal satellite propulsion unit PSP which ensures notably the thrust necessary for transfer from the low orbit to the final orbit. On two opposite lateral faces 24 and 25, commonly called the north face and the south face, because of their orientation with respect to the equatorial plane, are positioned two suites of solar panels 26 and 27 allowing electrical energy supply to the onboard systems. Various devices can be on board the lateral faces 28 and 29, commonly called the east and west face for their orientation with respect to a terrestrial longitude. The maintaining of a constant orientation of the satellite with respect to the earth is necessary for the proper conduct of the mission of the satellite, for example to orient the solar panels 26 and 27 or to point the telecommunications systems 21 towards the earth. This is carried out by means of an attitude control system. Several attitude control systems able to detect and correct orientation errors are known. Thus, the measurement of the orientation of the satellite can be carried out by means of a sensor set, comprising for example a sensor directed towards the earth, positioned on the earth face for a measurement on two axes, pitch and roll, with respect to the earth and a set 30 of gyroscopes for detecting the rotation rates in relation to three axes. On the basis of these measurements, corrections of orientation of the satellite about its centre of gravity can be carried out, for example by means of a set of inertia wheels 31 or of gyroscopic actuators.

A satellite equipped with such a system allowing attitude control is said to be stabilized in relation to three axes. Typically, by controlling the rotation rate and the orientation of the inertia wheels, it is possible to correct an orientation error in a reference trihedron tied to the satellite. Hereinafter, an axis directed towards the earth is called Z, also called the yaw axis, an axis perpendicular to the orbit and oriented in the opposite sense to the angular momentum of the orbit (towards the south for a geostationary) is called Y, also called the pitch axis, and an axis forming with Y and Z a right-handed orthogonal reference frame is called X, also called the roll axis which is oriented along the velocity in the case of circular orbits.

For orbit control, several propulsion units are disposed on the structure 20 of the satellite 10. A first propulsion unit of high power PSP, making it possible to ensure transfer between the initial terrestrial orbit (after launcher release) and the final orbit, is positioned on the anti-earth face 23. According to a known state of the art, a first set of propulsion units, comprising for example two propulsion units 32 and 33 positioned at the north face and at the south face in proximity to the anti-earth face, is used to control the inclination. A second set of propulsion units, such as for example the propulsion units 34 and 35, positioned at the east and west faces, is used for the control of the eccentricity and the drift. It is also known that control of the inclination requires of the order of five to ten times more fuel than control of the eccentricity and of the drift. For this reason, inclination control is in general carried out by means of plasma propulsion unit, consuming less fuel, while the propulsion units dedicated to the control of the eccentricity and of the drift are usually based on chemical propellant.

By way of example, a contemporary satellite of dry mass 2500 kg and making it possible to carry a payload of 900 kg, comprises a principal propulsion unit, two plasma propulsion units for the inclination and the eccentricity, and four propellant-based propulsion units for the eccentricity and the drift. Typically, 1700 kg of propellant are necessary for the initial orbit transfer, and 220 kg of Xenon are necessary to ensure orbit control of the satellite for a mission duration of about 15 years. Thus, the cost and mass of current propulsion systems limit the capacity to carry a high payload. Note also that in most known propulsion systems for orbit control, the various onboard propulsion units comprise in reality two propulsive motors positioned side by side, for mission safety and reliability reasons. This redundancy, well known to the person skilled in the art, is not represented in the figures but it is considered hereinafter that a propulsion unit can consist of one or more propulsive motors forming a propulsive assembly, and whose deliverable thrust is identical, in orientation or in intensity.

Figure 3A:
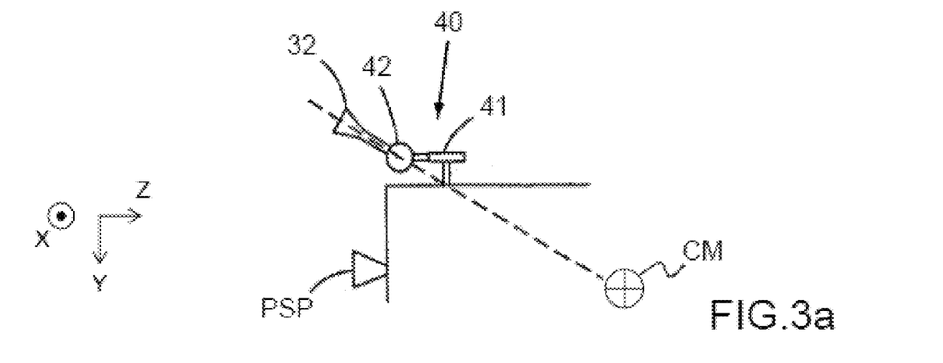
Figure 3B:
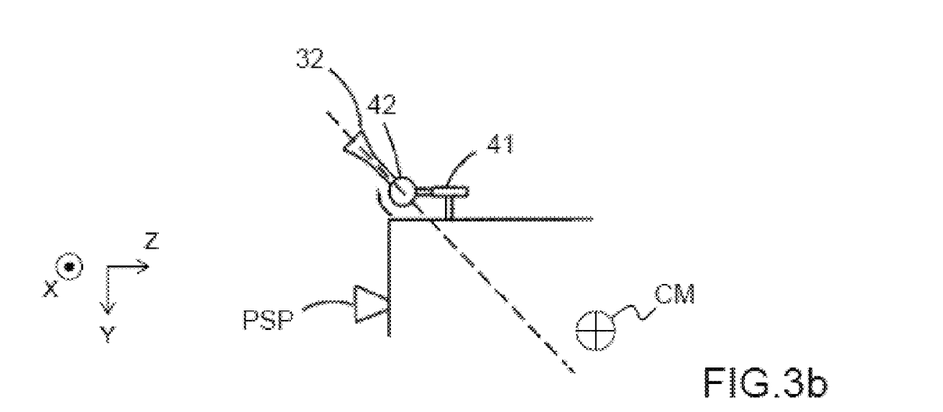
Figure 3C:
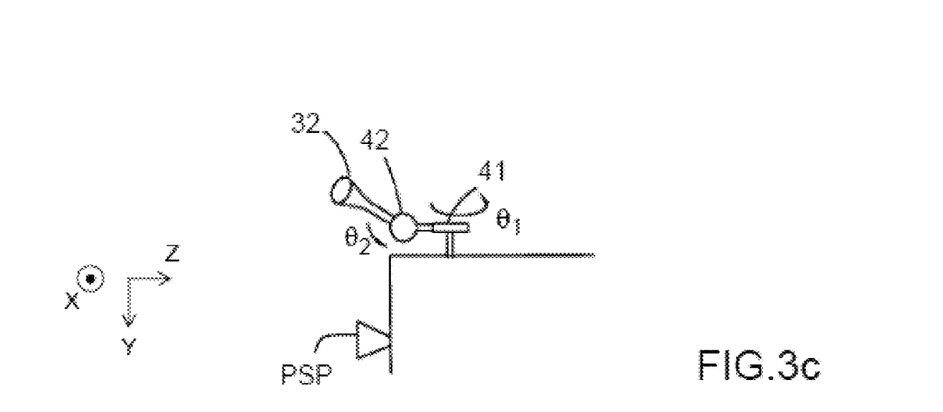

FIGS. 3a, 3b and 3c illustrate the principle of orbit control for a satellite according to the known state of the art. The structure 20 of the satellite 10 is represented in a side view, the east face being visible. The propulsion unit 32 is connected to the north face of the structure 20 by means of a two-axis mechanism 40. The two-axis mechanism 40 allows the rotation of the propulsion unit 32 with respect to the structure 20 in relation to a first axis parallel to the Y axis and a second axis parallel to the X axis. In FIGS. 3a to 3c, the two-axis mechanism 40 is a gimbal link produced by means of a first pivot link 41 with axis parallel to the Y axis and a second pivot link 42 with axis parallel to the X axis. The centre of mass of the satellite, situated inside the parallelepipedal structure 20, is referenced CM.

In FIG. 3a, the orientation of the propulsion unit 32 makes it possible to direct the thrust of the propulsion unit towards the centre of mass CM of the satellite. To perform an inclination correction manoeuvre, a technique known to the person skilled in the art consists in firing the propulsion unit 32 a first time in proximity to an orbital node, for example 15, and then the propulsion unit on the opposite side a second time in proximity to the opposite orbital node, 16 in the example. Thus, the thrust, oriented towards the centre of mass CM, of the first firing of the propulsion unit 32 displaces the satellite in a direction having a Z component and a Y component. Twelve hours later, the thrust of the second firing at the opposite orbital node, displaces the satellite in a direction having an opposite Z component to the first firing, and which compensates for the undesired effect thereof on the eccentricity and a likewise opposite Y component but whose desired inclination effects are aggregated. Thus, two firings of equal intensities carried out at twelve hourly intervals in proximity to the orbital nodes 15 and 16 make it possible to cancel the effect of the radial component and thus to preserve only a north-south correction. This known procedure allows daily correction of the inclination.

Through this same technique it is also possible, by applying a second thrust of different intensity from the first, to apply eccentricity corrections in relation to an axis perpendicular to the line joining the two orbital nodes 15 and 16. Techniques have also developed for allowing eccentricity corrections in relation to a second axis, by offsetting the firing of the propulsion unit with respect to the orbital node, but at the price of less effective control of the inclination. To summarize, the known systems make it possible by means of two propulsion unit systems 32 and 33 to ensure control of the inclination and control of the eccentricity in relation to an axis without deoptimization of the inclination control, or to ensure control of the inclination and control of the eccentricity in relation to two axes with deoptimization of the inclination control. Control of the drift may not be carried out by these two propulsion units. A contemporary satellite accordingly comprises four chemical-propellant nozzles positioned on the east and west faces of the satellite.

The propulsion unit systems 32 and 33 are also useful for managing the momentum of the attitude control systems, as illustrated in FIGS. 3b and 3c. By applying a thrust outside of the centre of mass CM—in a plane Y-Z in FIG. 3b and outside of the plane Y-Z in FIG. 3c, a rotation couple is generated on the satellite—a roll couple in FIG. 3b and a pitch and yaw couple in FIG. 3c. These two couples can be used to load or unload the inertia wheels in relation to two axes. For example, when the rotation rate of an inertia wheel reaches its limit velocity, it will be sought to orient the thrust intentionally outside of the centre of mass CM so as to generate, in addition to the desired displacement of the satellite, a couple making it possible to desaturate the inertia wheel, or more generally, the problem will be anticipated by reducing the angular momentum to desired values upon each manoeuvre. These desired values being able of course to be zero, but also a value judiciously defined so as to anticipate the evolution of the angular momentum between two manoeuvres under the effect of the solar radiation pressure notably.

Note also that the centre of mass of the satellite varies in the course of the life of the satellite, notably because of the progressive consumption of the onboard fuel. In the known systems, algorithms are implemented for the combined management of the attitude control and of the orbit control, and to make it possible to take into account the position of the centre of mass CM throughout the life of the satellite.

The issue of being able to have effective propulsion systems is therefore understood. The current solutions, which implement different nature propulsion units at various locations of the satellite are relatively complex and expensive and exhibit a high mass which limits the satellite's carrying capacity.

SUMMARY OF THE INVENTION

The invention is aimed at proposing an alternative solution for controlling the orbit and producing the couples to be exerted on the satellite during the manoeuvres while alleviating the implementational difficulties cited hereinabove.

For this purpose, the subject of the invention is a propulsion system for the orbit control of a satellite with terrestrial orbit having an angular momentum accumulation capacity, and for the generation of couples contributing to controlling the angular momentum, the said satellite being imbued with a velocity of displacement tangential to the terrestrial orbit. The propulsion system comprises a propulsion unit able to deliver a force along an axis F having a component perpendicular to the orbit, and a motorized mechanism connected on the one hand to the propulsion unit and on the other hand to a structure of the satellite. The said motorized mechanism is able to displace the propulsion unit along an axis V parallel to the velocity of the satellite, and able to orient the propulsion unit so as to make it possible to control:
a component of the force along the axis V, for orbit control,
an amplitude and a direction of couple in a plane perpendicular to the axis F, for control of the angular momentum.

Advantageously, the motorized mechanism comprises several hardware items connected together, and positioned in series between the structure of the satellite and the propulsion unit in the following order:
a first motorized link, allowing a rotation about an axis substantially parallel to the axis V, and a rotation about an axis substantially perpendicular both to the axis V and to the axis F,
a rigid offset arm,
a second motorized link, allowing a rotation about an axis substantially perpendicular both to the axis V and to the axis F.

Advantageously, the motorized mechanism comprises several hardware items connected together, and positioned in series between the structure of the satellite and the propulsion unit in the following order:
a first motorized link, allowing a rotation about an axis substantially perpendicular both to the axis V and to the axis F.
a rigid offset arm,
a second motorized link, allowing a rotation about an axis substantially parallel to the axis V, and a rotation about an axis substantially perpendicular both to the axis V and to the axis F.

Advantageously, the motorized mechanism comprises several hardware items connected together, and positioned in series between the structure of the satellite and the propulsion unit in the following order:
a motorized device, making it possible to transmit a translational motion substantially along the axis V,
a motorized link, allowing a first rotation about an axis substantially perpendicular to the axis F, and a second rotation about an axis substantially perpendicular both to the axis V and to the axis F.

Advantageously, the second motorized link is connected to the propulsion unit by way of a second offset arm.

Advantageously, the motorized mechanism comprises means for supplying energy of the structure of the satellite to the propulsion unit and/or the motorized mechanism.

The invention also pertains to a satellite with terrestrial orbit furnished with a propulsion system having the characteristics described above, and comprising a parallelepipedal structure. The propulsion unit and the motorized mechanism are maintained, in a storage configuration, against one of the faces of the structure of the satellite; the propulsion unit and the motorized mechanism being released and then reoriented in an operational configuration.

The invention also pertains to a satellite with terrestrial orbit furnished with a propulsion system having the characteristics described above and comprising a parallelepipedal structure. The first motorized link is fixed in proximity to the middle of an edge of the structure. The offset arm is maintained in the storage configuration against a face adjacent to this edge and substantially parallel to this edge.

The invention also pertains to a satellite with terrestrial orbit furnished with a propulsion system having the characteristics described above and comprising a parallelepipedal structure. The first motorized link is fixed in proximity to an edge of the structure. The two link arms are maintained in the storage configuration against a face adjacent to this edge and substantially parallel to this edge.

The invention also pertains to a satellite with geostationary orbit furnished with a propulsion system having the characteristics described above, characterized in that a first propulsion system is fixed to the structure of the satellite by a north side with respect to the plane of the orbit, and in that a second propulsion system is fixed to the structure of the satellite by a south side with respect to the plane of the orbit; the firing of the propulsion systems for several positions of the satellite on the orbit allowing the control of six orbital parameters of the satellite.

The invention finally pertains to a satellite with geostationary orbit furnished with a propulsion system having the characteristics described above, characterized in that a first propulsion system is fixed to the structure of the satellite by a north or south side with respect to the plane of the orbit, and in that a second propulsion system is fixed to the structure of the satellite by one and the same side as the first propulsion system; the firing of the propulsion systems for several positions of the satellite on the orbit allowing the control of six orbital parameters of the satellite.

BRIEF DESCRIPTION OF THE DRAWINGS

The invention will be better understood and other advantages will become apparent on reading the detailed description of the embodiments given by way of example in the following figures.

For the sake of clarity, the same elements will bear the same reference labels in the various figures.

DETAILED DESCRIPTION

FIGS. 4a, 4b, 4c and 4d represent four variants of a propulsion system according to the invention. As described above, a satellite 10 in orbit 11 is stabilized in relation to three axes of a reference trihedron tied to the satellite by means of an attitude control system. The reference trihedron comprises a Z axis oriented towards the earth, a Y axis perpendicular to the orbit and oriented in the opposite sense to the angular momentum of the orbital rotation, and an X axis forming with the Y and Z axes a right-handed orthogonal reference frame. The X axis is oriented in the direction of the velocity of the satellite in orbit 11 around the earth 12. The satellite 10 comprises a parallelepipedal structure 20, two of whose faces 22 and 23, termed the earth face and anti-earth face, are perpendicular to the Z axis and oriented respectively towards the earth and towards a direction opposite from the earth, and two opposite adjacent faces 24 and 25, termed the north face and south face, are perpendicular to the Y axis and oriented respectively towards the north and the south in the terrestrial magnetic field. Also denoted is a centre of mass CM of the satellite, whose position varies slightly in the course of the life of the satellite, which is situated inside the structure 20.

For the sake of clarity, the description of the invention rests upon the reference frame formed by the axes X, Y and Z and upon a satellite whose structure 20 is parallelepipedal. The invention is not limited in any way to a satellite whose structure 20 is parallelepipedal, nor to a satellite stabilized in relation to the three axes X, Y and Z. It extends in a general way to any satellite 10 with terrestrial orbit 11 having an angular momentum accumulation capacity, imbued with a velocity of displacement tangential to the terrestrial orbit 11. Hereinafter, the axis of the velocity is referenced axis V.

Figure 4A:
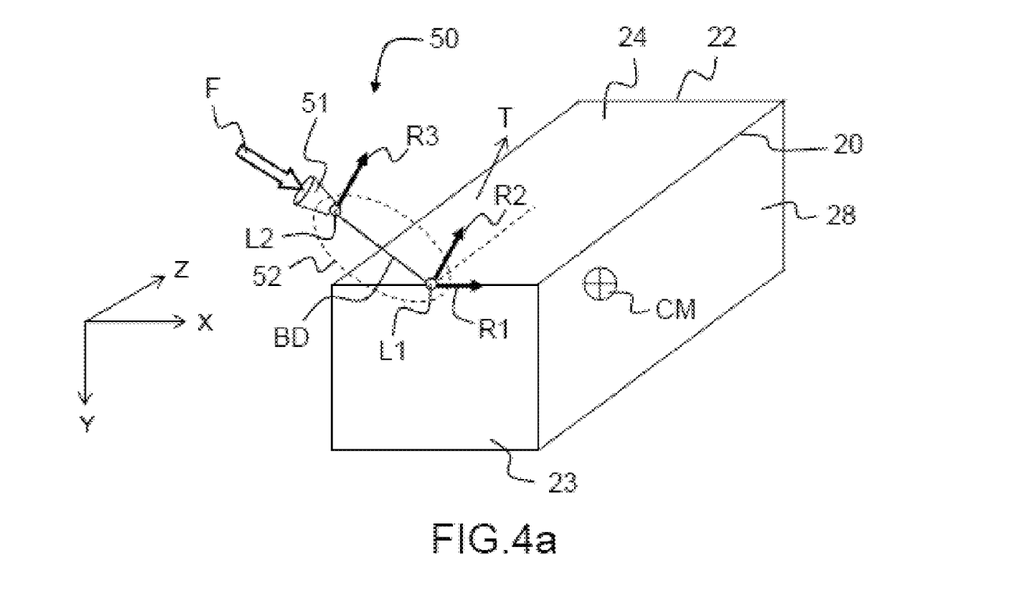
FIGS. 4a, 4b, 4c and 4d represent four variants of a propulsion system according to the invention.

In a first variant of the invention, such as described by FIG. 4a, a propulsion system 50 comprises a propulsion unit 51 able to deliver a force along an axis F having a component perpendicular to the orbit 11, that is to say along the Y axis in the figure, and a motorized mechanism 52 connected on the one hand to the propulsion unit 51 and on the other hand to a structure 20 of the satellite 10.

Advantageously, the motorized mechanism 52 comprises several hardware items connected together, and positioned in series between the structure 20 of the satellite 10 and the propulsion unit 51 in the following order:
a first motorized link L1, allowing a rotation about an axis R1 substantially parallel to the axis V, that is to say parallel to the X axis in the figure, and a rotation R2 about an axis substantially perpendicular both to the axis V and to the axis F,
a rigid offset arm BD,
a second motorized link L2, allowing a rotation about an axis R3 substantially perpendicular both to the axis V and to the axis F.

Figure 4B:
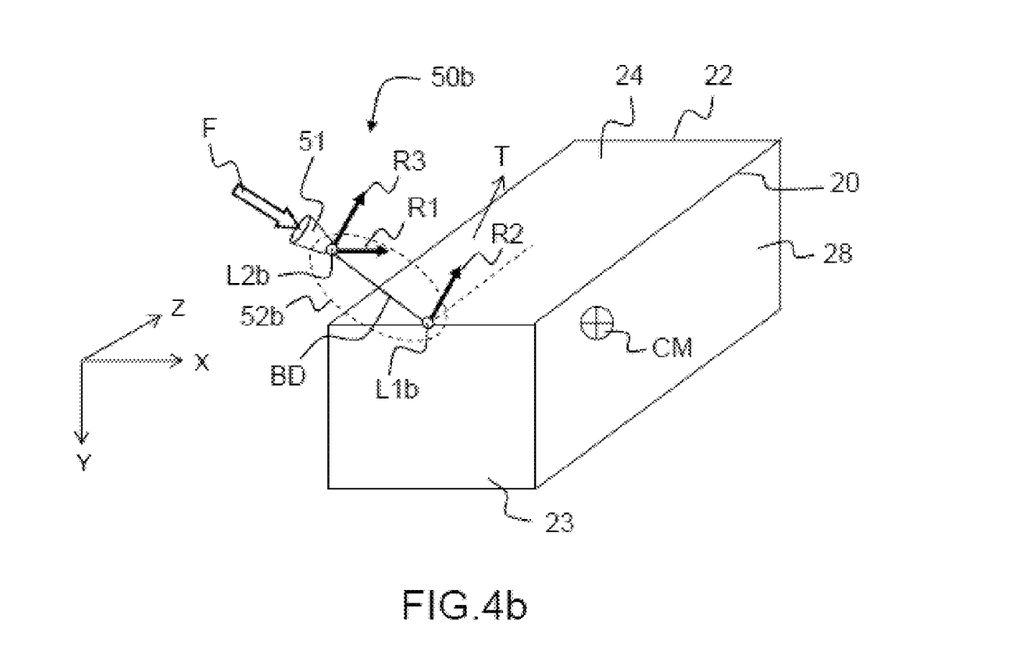

In a second variant of the invention, such as described by FIG. 4b, a propulsion system 50b comprises a propulsion unit 51 able to deliver a force along an axis F having a component perpendicular to the orbit 11, that is to say along the Y axis in the figure, and a motorized mechanism 52b connected on the one hand to the propulsion unit 51 and on the other hand to a structure 20 of the satellite 10.

Advantageously, the motorized mechanism 52b comprises several hardware items connected together, and positioned in series between the structure 20 of the satellite 10 and the propulsion unit 51 in the following order:
a first motorized link L1b, allowing a rotation about an axis R2 substantially perpendicular both to the axis V and to the axis F,
a rigid offset arm BD,
a second motorized link L2b, allowing a rotation about an axis R1 substantially parallel to the axis V, and a rotation about an axis R3 substantially perpendicular both to the axis V and to the axis F.

Figure 4C:
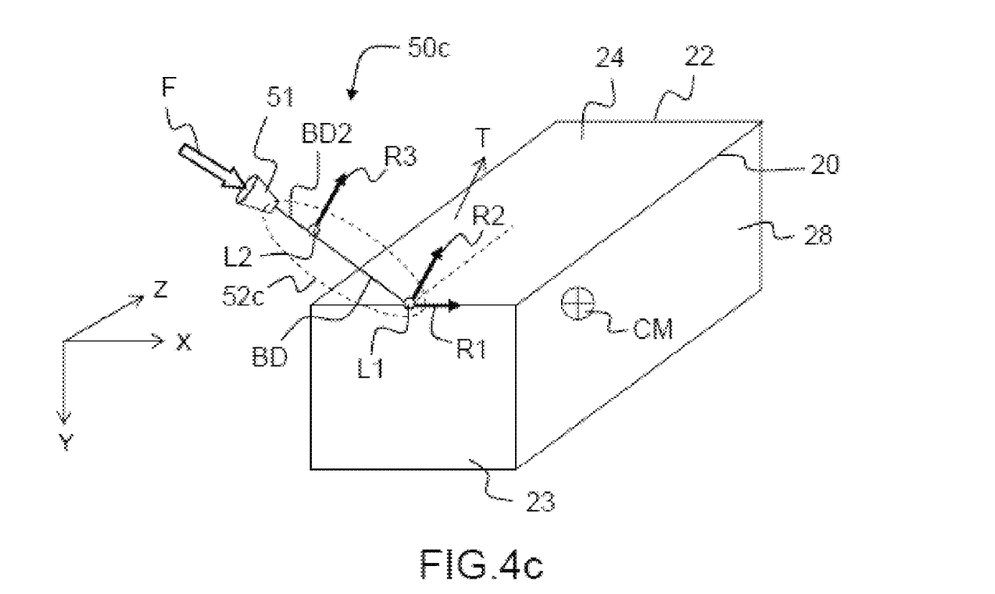

In a third variant of the invention, such as described by FIG. 4c, a propulsion system 50c comprises a propulsion unit 51 and a motorized mechanism 52c. Advantageously, the mechanism 52c comprises the same hardware items as the motorized mechanism 52 or 52b, described respectively in FIGS. 4a and 4b, and furthermore comprises a second offset arm BD2 connecting the second motorized link, L2 or L2b, and the structure 20 of the satellite 10.

The three variants represented in FIGS. 4a, 4b and 4c are therefore characterized by the fact that the motorized mechanism comprises:
a first motorized link, L1 or L1b, allowing a rotation about an axis R2 substantially perpendicular both to the axis V and to the axis F,
a rigid offset arm BD,
a second motorized link, L2 or L2b, allowing a rotation about an axis R3 substantially perpendicular both to the axis V and to the axis F; and by the fact that the first motorized link, L1 in this case, or the second motorized link, L2 in this case, furthermore allows a rotation about an axis R1 substantially parallel to the axis V.

Stated otherwise, the propulsion system comprises three rotational degrees of freedom, two of which are mutually parallel and separated by an offset arm. The disposition of these two mutually parallel rotation axes perpendicular both to the axis V and to the axis F advantageously makes it possible, through equal amplitude rotations in opposite directions:
to modify the couple about the direction T perpendicular to F and to V, but:
to not modify the projection of the forces in the satellite axes, and
to not modify the couple about V.

This decoupling of one of the couple axes constitutes a substantial advantage for the piloting of the mechanism for the purposes of solving the global problem aimed at determining:
the mechanism angles and
the duration of application of the force, making it possible to carry out at one and the same time:
the positioning of the point of application of the force,
the orientation of the force and
the duration of application of the force which will lead to the desired velocity increments (integral of the force) and desired angular momentum variations.

Figure 4D:
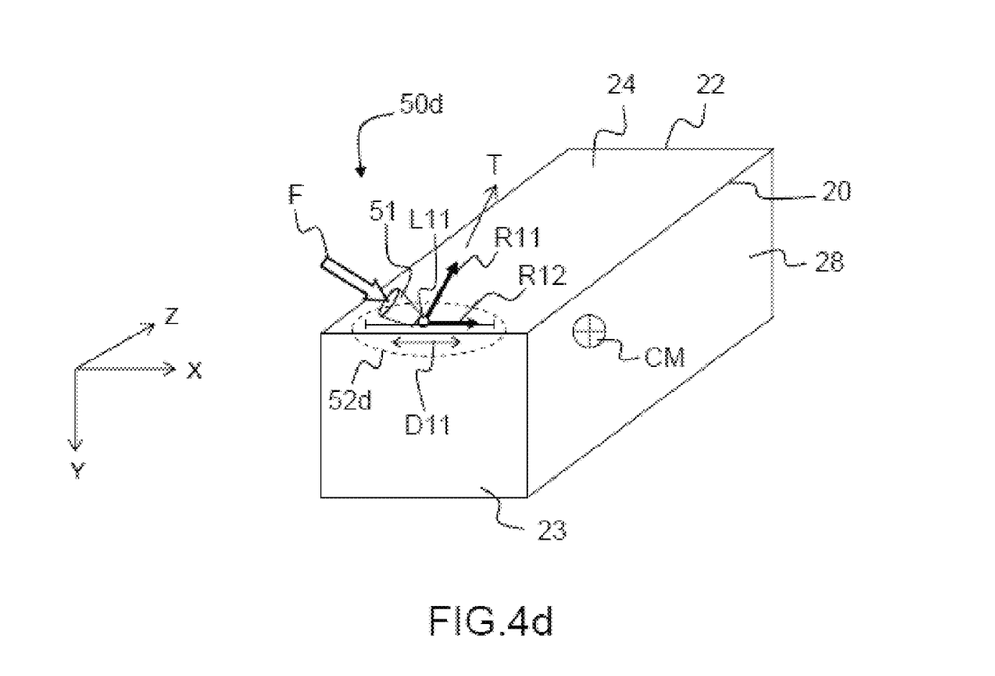

In a fourth variant of the invention, such as described by FIG. 4d, a propulsion system 50d comprises a propulsion unit 51 able to deliver a force along an axis F having a component perpendicular to the orbit 11, and a motorized mechanism 52d connected on the one hand to the propulsion unit 51 and on the other hand to a structure 20 of the satellite 10.

Advantageously, the motorized mechanism 52d comprises several hardware items connected together, and positioned in series between the structure 20 of the satellite 10 and the propulsion unit 51 in the following order:

a motorized device D11, making it possible to transmit a translational motion substantially along the axis V, a motorized link L11, allowing a first rotation about an axis R11 substantially perpendicular to the axis F, and a second rotation about an axis R12 substantially perpendicular both to the axis V and to the axis R11.

For these variants of the invention, various mechanisms can be implemented for producing the motorized links L1, L1b, L2, L2b, D11 or L11. A non-exhaustive list comprises in particular motorized-gimbal links, or two-axis mechanism, motorized-pivot links. The offset arms BD and BD2 can be of substantially slender shape as represented in FIG. 4a to 4c, or can comprise a succession of several substantially slender rods connected together by elbows. As mentioned previously, a propulsion unit 51 can also comprise two propulsive motors for safety and reliability reasons.

In an operational phase of the satellite, the satellite 10 being in orbit 11 around the earth 12, the propulsion unit 51 connected to the motorized mechanism 52, 52b, 52c or 52d, according to any one of the four variants of the invention, can be displaced and oriented by means of the motorized links. In particular, it is possible to position the propulsion unit 51 in a plane perpendicular to the X axis containing the centre of mass CM, and to orient its thrust towards the centre of mass CM. In this configuration, the propulsion system is functionally equivalent to the known systems described by FIGS. 3a, 3b and 3c in a perfect case of knowledge of the centre of mass and alignments; by applying a thrust in proximity to the orbital nodes 15 and 16, it allows control of the inclination and of the eccentricity in relation to an axis without deoptimization of the inclination control, or control of the inclination and of the eccentricity in relation to two axes with deoptimization of the inclination control. The motorized mechanism 52, 52b, 52c or 52d also makes it possible to position the propulsion unit 51 outside of a plane perpendicular to the X axis containing the centre of mass CM, and to orient its thrust towards the centre of mass CM. In this configuration, the propulsion system 50 makes it possible to apply a thrust to the centre of mass CM having a desired X component, that is to say along the velocity, in addition to a Y component and/or a Z component. This characteristic is particularly advantageous since it makes it possible to afford the propulsion system 50 the capacity for control of the orbit in terms of drift, or stated otherwise the capacity to correct the position of the satellite along the X axis, eastwards or westwards. Likewise, according to techniques known to the person skilled in the art, the propulsion system makes it possible, by orienting the force of the propulsion unit along an axis not passing through the centre of mass CM, to generate a couple for the control of the angular momentum of the satellite.

Thus, as a function of various constraints, of integration on the satellite, of cost, or else of mass, various variants of the propulsion system, notably the four variants described hereinabove, can be envisaged according to the invention. These variants of the propulsion system have in common a propulsion unit 51 able to deliver a force along an axis F having a component perpendicular to the orbit 11, and a motorized mechanism, 52, 52b, 52c or 52d, connected on the one hand to the propulsion unit 51 and on the other hand to a structure 20 of the satellite 10, the said motorized mechanism 52, 52b, 52c or 52d being able to displace the propulsion unit 51 along an axis V parallel to the velocity of the satellite 10, and able to orient the propulsion unit 51 so as to make it possible to control:

a component of the force along the axis V, for orbit control, an amplitude and a direction of couple in a plane perpendicular to the axis F, for control of the angular momentum.

Figure 5A:
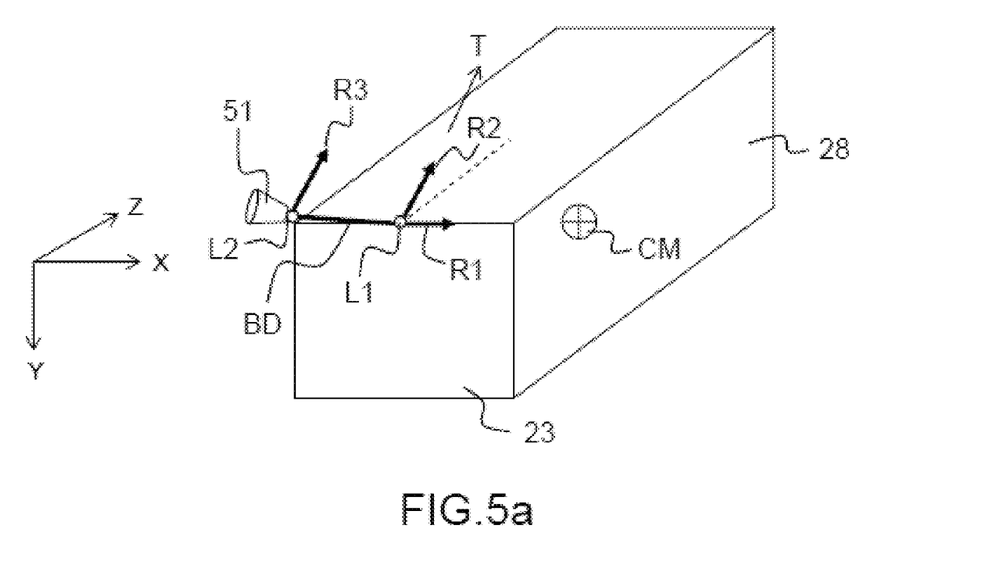
FIGS. 5a, 5b and 5c represent a propulsion system in the storage configuration according to three embodiments of the invention.
Figure 5B:
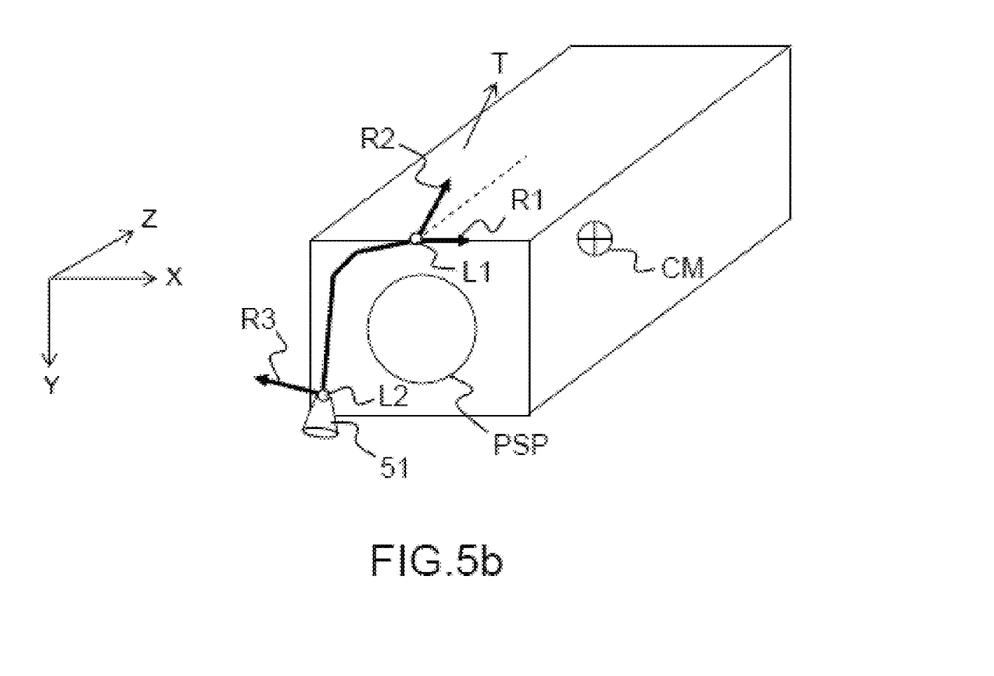
Figure 5C:
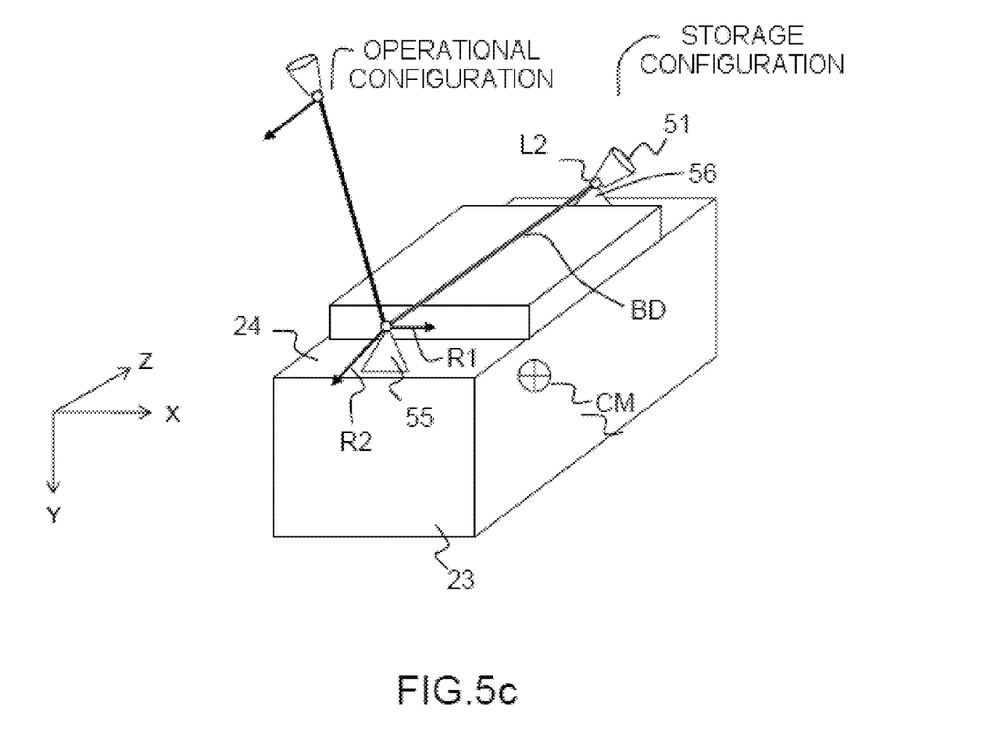

FIGS. 5a, 5b and 5c represent a propulsion system in the storage configuration according to three embodiments of the invention. A propulsion system 50 is represented in FIGS. 5a to 5c, the invention could in the same manner apply to a propulsion system 50b or 50c for the three embodiments of storage configuration.

During a launch phase using a launcher spacecraft, the propulsion system 50 is, in a storage configuration, able to maintain the propulsion unit 51 and the motorized mechanism 52 against one of the faces of the structure 20 of the satellite 10, so as to maintain it in the volume limited by the payload fairing of the launcher, and protect it from the high launch-related stresses due to acceleration and vibration. In a subsequent operational phase, the propulsion unit 51 and the motorized mechanism 52 are released and positioned in the operational configuration, for example such as represented in FIGS. 4a, 4b and 4c.

FIG. 5a represents a propulsion system 50 in the storage configuration according to a first embodiment. Advantageously, the first motorized link L1 is fixed in proximity to the middle of an edge of the structure 20, and the offset arm BD is maintained in the storage configuration against a face adjacent to this edge and substantially parallel to this edge. A slender offset arm BD of length substantially equal to half the length of the edge, making it possible to maintain the propulsion unit in proximity to the structure of the satellite, is implemented. This first embodiment advantageously allows simple and compact storage of the propulsion system. This embodiment can also apply to a propulsion system 50d, the offset arms BD and BD2 being folded back one against the other and maintained against the structure of the satellite. Advantageously, the first motorized link L1 is fixed in proximity to an edge of the structure 20, and the two link arms BD and BD2 are maintained in the storage configuration against a face adjacent to this edge and substantially parallel to this edge FIG. 5b represents a propulsion system 50 in the storage configuration according to a second embodiment. The first motorized link L1 is fixed in proximity to the middle of an edge of the structure 20, and the offset arm BD is maintained in the storage configuration against one of the adjacent faces, circumventing if required the elements which cannot be covered at launch, such as the launcher interface ring. In FIG. 6b, the link L1 is fixed in proximity to the edge common to the north face 24 and anti-earth face 23, the offset arm BD and the propulsion unit 51 are maintained against the anti-earth face 23. With the aim of limiting the bulkiness of the propulsion system 50 in the storage configuration, and notably allowing the use of a principal propulsion unit PSP positioned at the centre of the anti-earth face, an elbow-bend offset arm is implemented. This second embodiment improves the effectiveness of the inclination control, by allowing the storage of an offset arm of larger dimension than in the first variant.

FIG. 5c represents a propulsion system 50 according to a third embodiment. For better understanding, the propulsion system is represented in the storage configuration and in the operational configuration. The first motorized link L1 is fixed in proximity to an edge of the structure 20, and the offset arm BD is maintained in the storage configuration against the north face 24 or the south face 25. In a contemporary satellite architecture, the solar panels 26 and 27 are, in the storage configuration, folded back and maintained respectively against the north face 24 and south face 25. In the figure, the propulsion system, fixed on the north face 24 in proximity to the anti-earth face 23 in the figure, is maintained in the storage configuration by means of two supports 55 and 56 fixed on the north face 24, on either side of the solar panels 26 folded back against the north face 24; the two supports 55 and 56 being configured so as to insert, in the storage configuration, the solar panels 26 between the north face 24 of the structure 20 and the offset arm BD of the propulsion system. This third embodiment further improves the effectiveness of the inclination control, by allowing the storage of an offset arm of large dimension able to position and orient the propulsion unit so as to deliver a thrust on the centre of mass CM whose component along the Y axis is much greater than the components along the X and Z axes.

Various devices for maintaining the propulsion system in the storage configuration are envisaged according to the invention; pyrotechnic devices in particular are envisaged.

Advantageously, the motorized mechanism 52 of the propulsion system 50 according to the invention comprises pipelines for supplying fuel of the structure 20 of the satellite 10 to the propulsion unit 51, and/or means of the means for supplying electrical energy to the propulsion unit 51 and the motorized mechanism 52. The propulsion unit 51 can be of chemical type or of electrical type. For a chemical propulsion unit, the pipelines transport a chemical fuel of propellant type; for an electric propulsion unit, the pipelines transport a fuel of Xenon or Krypton type.

The invention also pertains to a satellite with terrestrial orbit, and more particularly geostationary, furnished with a propulsion system having the characteristics described above.

Figure 6:
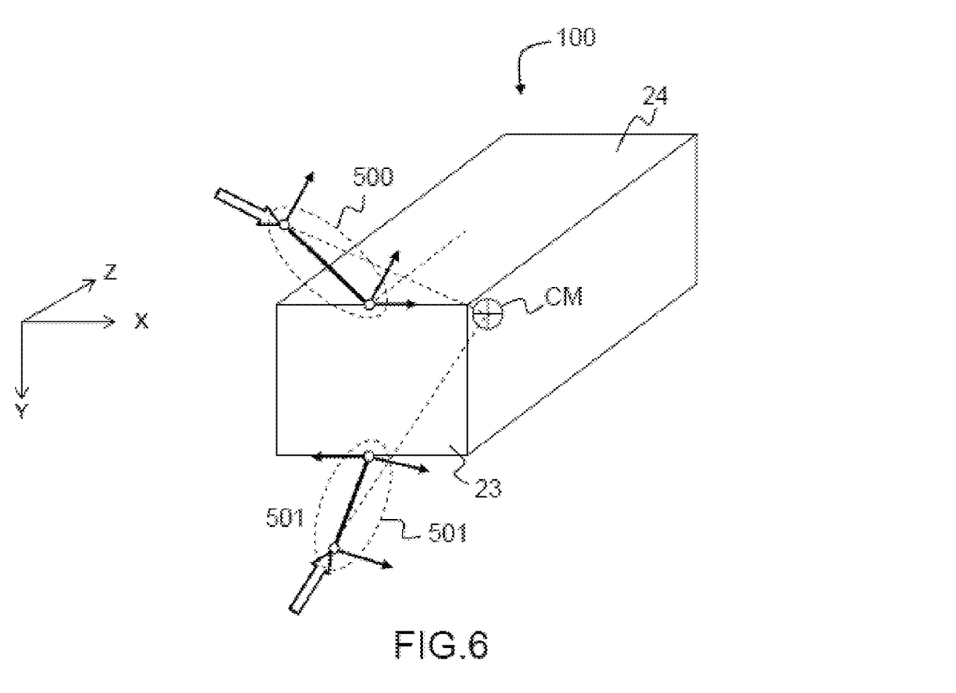
FIG. 6 represents a satellite with geostationary orbit furnished with propulsion systems in a first embodiment according to the invention.

FIG. 6 represents a satellite with geostationary orbit furnished with propulsion systems in a first embodiment according to the invention. A satellite 100 comprises a first propulsion system 500 fixed to the structure 20 of the satellite 100 by a north side with respect to the plane of the orbit 11, and a second propulsion system 501 fixed to the structure 20 of the satellite 100 by a south side with respect to the plane of the orbit 1. The firing of the propulsion systems 500 and 501 for several positions of the satellite 100 on the orbit 11 allows control of the six orbital parameters of the satellite 100. In the particular case of a geostationary satellite having a parallelepipedal structure, as represented in FIG. 6, the first propulsion system 500 can advantageously be fixed to the structure 20 on the north face 24 and in proximity to the anti-earth face 23, and the second propulsion system 501 can be fixed to the structure 20 on the south face 25 and in proximity to the anti-earth face 23.

The two propulsion systems 500 and 501 thus configured allow total orbit control. The successive firing of the propulsion systems 500 and 501 for several positions of the satellite on the orbit makes it possible to control the inclination and the eccentricity along an axis by thrusts in a plane Y-Z at the orbital nodes, and to control the drift and the eccentricity according to a second axis by thrusts outside of a plane Y-Z, carried out by means of the two propulsion systems 500 and 501 according to the invention. These orbit control techniques are known to the person skilled in the art and are not described in detail here. We shall simply recall the conventional technique of two manoeuvres separated by half an orbit whose radial components compensate one another, or the possibility, notably in the case of a fault with one of the two systems, of using only the one remaining at suitable places in the orbit to continue to achieve total control of the orbit, at the price of a deoptimization of the effectiveness of the manoeuvres, and therefore of the residual lifetime of the satellite in terms of fuel.

This first implementation according to the invention is particularly advantageous since it allows, by means of two propulsion systems only, total orbit control as well as a capacity in terms of couple for the control of the angular momentum. Thus, propulsion units dedicated to the control of drift and commonly implemented in the known state of the art, such as the propulsion units 34 and 35 of FIG. 2, generally of chemical type, are not necessary. The implementation of the two propulsion systems 500 and 501, preferably of electrical type, thus makes it possible to simplify the global architecture of the satellite and to reduce the fuel requirement. On a satellite with contemporary architecture, this represents a mean saving of possibly as much as 100 kg of chemical propellants in addition to the economic savings related to the discarding of four chemical nozzles, or more generally, in the case of systems combining the production of the tangential forces with other functions, it allows simplification and/or optimization of the initial propulsive system.

Advantageously, the propulsion systems 500 and 501 can furthermore be used for transfer from the initial orbit (after launcher release) to the target orbit. In a configuration suitable for transfer of orbit, the two propulsion systems 500 and 501 are positioned and oriented in such a way that the forces delivered by the propulsion units of each of the two propulsion systems 500 and 501 generate a thrust on the satellite in a desired direction and according to a controlled couple; the aim of the couple generation being to aid the attitude control of the satellite or to aid control of the angular momentum of the satellite. Stated otherwise, the forces of each system act essentially in the direction of the desired velocity increment, and the total couple of the two systems can be set to zero in relation to the three axes, or to values making it possible to alter the attitude of the satellite or the onboard angular momentum, as necessary.

Advantageously, the simultaneous firing of the propulsion systems 500 and 501 thus configured makes it possible to deliver a thrust parallel to the Z axis, stated otherwise having zero couple. The propulsion systems 500 and 501 according to the invention make it possible to assist, at least over a portion of the orbit transfer, a principal propulsion unit PSP of higher consumption. In a still more advantageous variant, the propulsion systems 500 and 501 according to the invention allow the orbit transfer on their own, without the assistance of a principal propulsion unit PSP.

Figure 7:
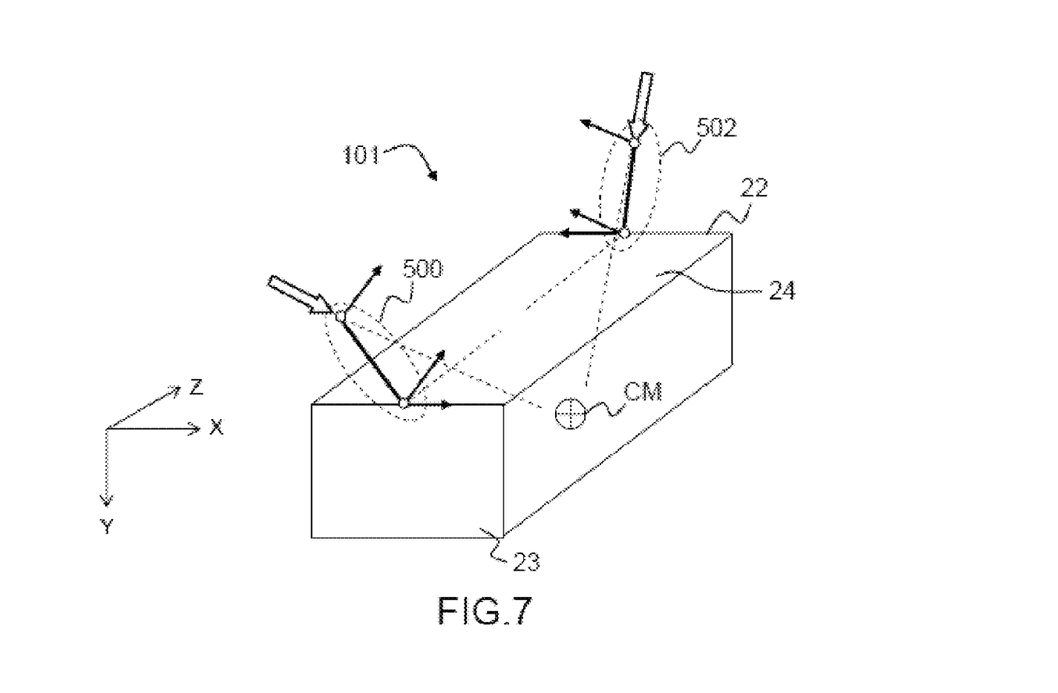
FIG. 7 represents a satellite with geostationary orbit furnished with propulsion systems in a second embodiment according to the invention.

FIG. 7 represents a satellite with geostationary orbit furnished with propulsion systems in a second embodiment according to the invention. A satellite 101 comprises a first propulsion system 500 fixed to the structure 20 of the satellite 101 by a north or south side with respect to the plane of the orbit 11, and a second propulsion system 502 fixed to the structure 20 by one and the same side as the first propulsion system 500. The firing of the propulsion systems 500 and 502 for several positions of the satellite 101 on the orbit 11 allows control of the six orbital parameters of the satellite. In the particular case of a geostationary satellite having a parallelepipedal structure, as represented in FIG. 7, the first propulsion system 500 can be fixed to the structure 20 on the north face 24 and in proximity to the anti-earth face 23, and the second propulsion system 502 can be fixed to the structure 20 on the north face 24 and in proximity to the earth face 22.

The two propulsion systems 500 and 502 thus configured allow total orbit control. According to a technique known to the person skilled in the art, an inclination correction is possible by simultaneous firing of the propulsion systems 500 and 502, so as to cancel, instantaneously in this embodiment, the Z components of the two thrusts. For a southward correction, a simultaneous firing is carried out in proximity to the so-called ascending orbital node, that is to say when the orbit trajectory crosses the equatorial plane from south to north; for a rigging on the south face, a simultaneous firing is carried out in proximity to the so-called descending orbital node, that is to say when the orbit trajectory crosses the equatorial plane from north to south. According to a principle similar to that described for FIG. 6, control of the eccentricity and the drift is possible by thrusts outside of a plane Y-Z, carried out by means of the two propulsion systems according to the invention, either at the nodes for optimal effectiveness of the inclination control, or offset from these nodes for an optimal compromise of the control of all the orbital parameters. These orbit control techniques are known to the person skilled in the art and are not described in greater detail here.

This second implementation according to the invention is particularly advantageous since it makes it possible to release one of the north or south faces from the bulkiness of the propulsion systems. Furthermore the joint use of the two systems lifts the obligation for a thrust oriented towards the vicinity of the centre of mass so that this results in a zero or fairly low amplitude couple so as to be compatible with the management of the angular momentum. It then becomes possible to accord the propulsion units still more effectiveness in the direction perpendicular to the orbit, by making their thrust orientation approach closer to this axis, such as illustrated in FIG. 7.

Advantageously, the propulsion units of each of the propulsion systems 500 and 502 are oriented so as to deliver a force along an axis not passing through a centre of mass CM of the satellite, and the simultaneous firing of the propulsion units is able to generate a zero couple.

Advantageously, the propulsion units of each of the propulsion systems 500 and 502 are oriented so as to deliver a force along an axis not passing through a centre of mass CM of the satellite with the aim of generating a thrust having a significant component along the axis perpendicular to the orbit.

Figures 8A, 8B, 8C:
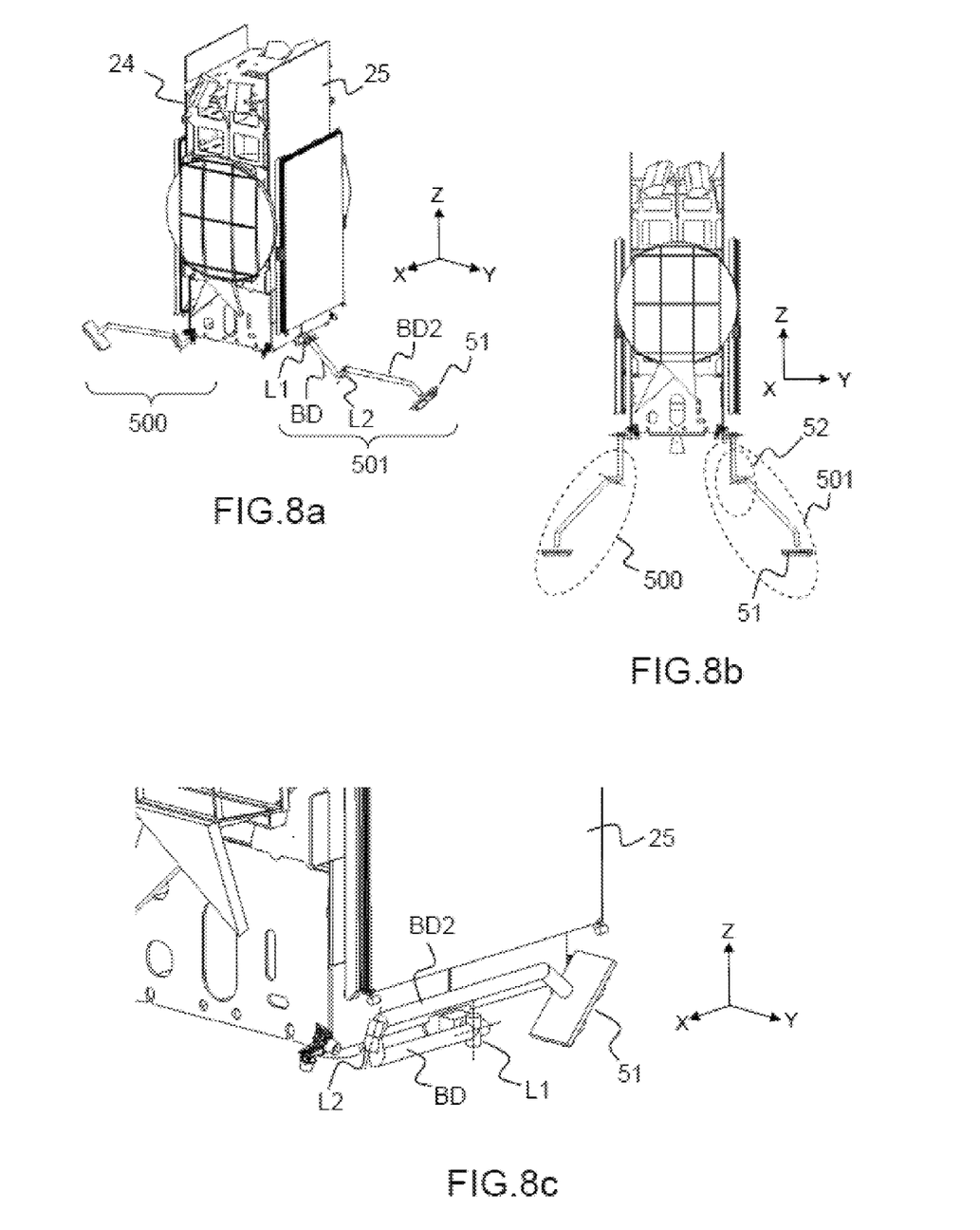
FIGS. 8a, 8b and 8c represent according to three different views, a satellite furnished with propulsion systems in a favoured implementation of the invention.

By way of example, FIGS. 8a, 8b and 8c represent according to three different views, a satellite furnished with propulsion systems in a favoured implementation of the invention. A satellite 100 is furnished with two propulsion systems 500 and 501 fixed respectively on the north and south faces 24 and 25, in proximity to the anti-earth face 23. According to the invention, the propulsion systems 500 and 501 comprise a propulsion unit 51 and a motorized mechanism 52 comprising a motorized link L1, an offset arm BD, a motorized link L2 and a second offset arm BD2 connecting the mechanism 52 to the propulsion unit 51.

FIG. 8a represents the propulsion systems 500 and 501 in the operational configuration, suitable for orbit control. FIG. 8b represents the propulsion systems in a configuration suitable for orbit transfer. FIG. 8c represents the propulsion systems in the storage configuration.

The invention claimed is:

1. A propulsion system for orbit control of a satellite with terrestrial orbit having an angular momentum accumulation capacity, and for creation of torques contributing to controlling the angular momentum, the satellite being imbued with a velocity along an axis V that is tangential to the terrestrial orbit, the propulsion system comprising:

a propulsion unit able to deliver a force along an axis F having a component perpendicular to the orbit; and
a motorized mechanism connected between the propulsion unit and a structure of the satellite,
wherein the motorized mechanism includes:
a first motorized link connected to the structure of the satellite and configured to allow a rotation about an axis substantially perpendicular both to the axis V and to the axis F,
a first rigid offset arm,
a second motorized link configured to allow a rotation about an axis substantially perpendicular both to the axis V and to the axis F,
a second rigid offset arm connected between the second motorized link and the propulsion unit, and
the first motorized link, the first rigid offset arm, and the second motorized link being connected and positioned in series from the first motorized link to the second motorized link,
wherein the first motorized link or the second motorized link is configured to allow a rotation about an axis substantially parallel to the axis V,
wherein the motorized mechanism consists of three rotational degrees of freedom, two of the three rotational degrees of freedom being mutually parallel and separated by the first rigid offset arm,
wherein the motorized mechanism is configured to displace the propulsion unit along the axis V parallel to the velocity of the satellite and orient the propulsion unit so as to make it possible to control:
a component of the force along the axis V for orbit control, and
an amplitude and a direction of couple in a plane perpendicular to the axis F for control of the angular momentum.

2. The propulsion system according to claim 1, wherein the motorized mechanism comprises means for supplying energy of the structure of the satellite to the propulsion unit and/or the motorized mechanism.

3. A satellite with terrestrial orbit with a propulsion system according to claim 1, comprising a parallelepipedal structure, and wherein the propulsion unit and the motorized mechanism are maintained, in a storage configuration, against one of the faces of the structure of the satellite; the propulsion unit and the motorized mechanism being released and then reoriented in an operational configuration.

4. A satellite with terrestrial orbit with a propulsion system according to claim 1, comprising a parallelepipedal structure, and wherein the first motorized link is fixed in proximity to the middle of an edge of the structure, and wherein the offset arm is maintained in the storage configuration against a face adjacent to this edge and substantially parallel to this edge.

5. A satellite with terrestrial orbit with a propulsion system according to claim 1, comprising a parallelepipedal structure, and wherein the first motorized link is fixed in proximity to an edge of the structure, and wherein the first rigid offset arm and the second rigid offset arm are maintained in the storage configuration against a face adjacent to this edge and substantially parallel to this edge.

6. A satellite with geostationary orbit with a propulsion system according to claim 1, wherein a first propulsion system is fixed to the structure of the satellite by a north side with respect to the plane of the orbit, and wherein a second propulsion system is fixed to the structure of the satellite by a south side with respect to the plane of the orbit; the firing of the propulsion systems for several positions of the satellite on the orbit allowing the control of six orbital parameters of the satellite.

7. A satellite with geostationary orbit according to claim 6, wherein the two propulsion systems are, in a configuration suitable for orbit transfer, positioned and oriented in such a way that the forces delivered by the propulsion units of each of the two propulsion systems generate a thrust on the satellite in a desired direction and according to a controlled couple; the aim of the couple generation being to aid the attitude control of the satellite or to aid control of the angular momentum of the satellite.

8. A satellite with geostationary orbit with a propulsion system according to claim 1, wherein a first propulsion system is fixed to the structure of the satellite by a north or south side with respect to the plane of the orbit, and wherein a second propulsion system is fixed to the structure of the satellite by one and the same side as the first propulsion system; the firing of the propulsion systems for several positions of the satellite on the orbit allowing the control of six orbital parameters of the satellite.

9. A satellite with geostationary orbit according to claim 8, wherein the propulsion units of each of the propulsion systems are oriented so as to deliver a force along an axis not passing through a centre of mass of the satellite, and wherein the simultaneous firing of the propulsion units is able to generate a zero couple.

10. A satellite with terrestrial orbit according to claim 8, wherein the propulsion units of each of the propulsion systems are oriented so as to deliver a force along an axis not passing through a centre of mass of the satellite with the aim of generating a thrust having a significant component along the axis perpendicular to the orbit.

* * * * *